June 30, 1964  SVEN-OLOF KRONOGÅRD  3,138,923
AUTOMOTIVE GAS TURBINE POWER PLANT
Filed March 22, 1957  2 Sheets-Sheet 1
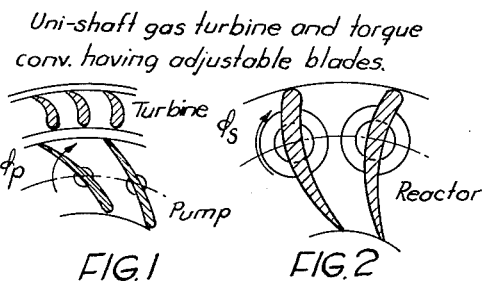
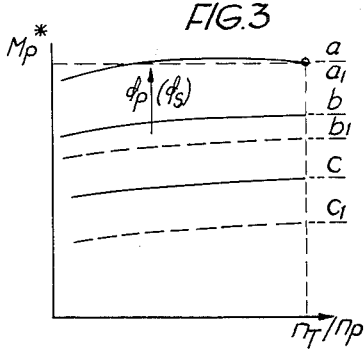
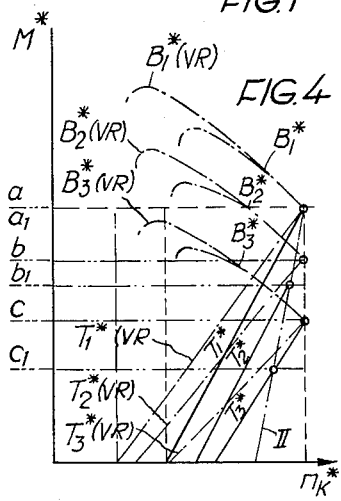
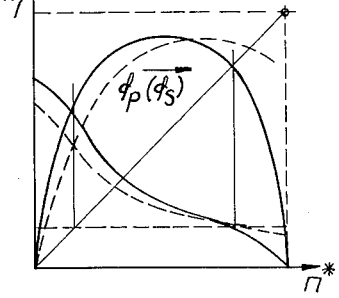

United States Patent Office 3,138,923
Patented June 30, 1964

3,138,923
AUTOMOTIVE GAS TURBINE POWER PLANT
Sven-Olof Kronogård, Goteborg, Sweden, assignor to Ab Volvo, Goteborg, Sweden, a corporation of Sweden
Filed Mar. 22, 1957, Ser. No. 647,883
Claims priority, application Sweden Mar. 24, 1956
1 Claim. (Cl. 60—39.2)

By reason of their properties gas turbine power plants are not directly suitable for automotive purposes. An improvement is obtained, if the gas turbine is combined with a hydrodynamic torque converter and with a mechanical gearing connected thereto in the ordinary manner, said gearing being of the planet gear type, for example. Still many drawbacks remain even in the latter case.

The present invention has for its object to provide a gas turbine power plant, which with respect to its torque characteristic is exceedingly well suited to vehicle drive, for example. The gas turbine power plant according to the invention comprises a compressor member, a combustion chamber member, a turbine member and a hydrodynamic torque converter, and is substantially distinguished by the feature that the reaction member of the hydrodynamic torque converter is provided with adjustable blades. By an adjustment of these blades the torque and the number of revolutions of the output shaft of the plant may be varied in a particularly advantageous manner, for instance so that the gas turbine may operate at a substantially constant speed or at a speed which increases with an increasing speed of the output shaft, and vice versa. The plant also attains a very good efficiency and consequently a relatively low consumption of fuel.

A simple form of embodiment of the invention may consist of a gas turbine, wherein the turbine member and the compressor member are arranged on the same shaft, which is connected either directly or over a reduction gear to the pump member of the hydrodynamic torque converter, the latter then comprising a pump and a turbine rim with fixed blades and a reaction member (guide blade rim) with adjustable blades. By varying the outlet angle and the outlet area of the guide blade rim an alteration of the absorbed torque of the hydrodynamic torque converter is brought about in such manner that the absorbed pump torque is reduced with a decreasing outlet angle and outlet area. At the same time a displacement of the efficiency curve is obtained in such manner that the top point and the coupling point thereof are displaced toward lower speed ratios between the turbine and the pump, the starting gear ratio than also increasing (up to a certain value, after which it falls somewhat).

As indicated above, the uni-shaft gas turbine could not by reason of its torque characteristic, unsuitable above all for automotive purposes, be used for the operation of vehicles or within industrial fields of use, where one operates with large variations with respect to loads and speeds. The torque curve for the useful torque of the uni-shaft gas turbine, corresponding to a constant turbine temperature, is understood to show a very pronounced positive slope (derivate), which makes this type of engine unstable under certain conditions, to which is added the fact that a negative slope of the torque curve for the output shaft is desired in connection with a varying load. As a comparison it might be mentioned that carburetor engines of the reciprocating type generally show a somewhat negative slope of the torque curve, whereas diesel engines show a nearly constant torque, that is to say, a slope of the approximate value of zero. Therefore, said reciprocating engines require in automotive and in most industrial fields of use a special gearing to be able to cope with any occurring load variations. By reason, inter alia, of the horizontal or slightly negatively sloping torque characteristic in said reciprocating engines a good adaptability is nevertheless obtained, in case a hydrodynamic torque converter (positive turbine torque characteristic) be used. The torque curves for the absorbed torque of the hydrodynamic torque converter and the engine intersect each other at a large angle, which is of the order of 90° or thereabout.

In a combination of a hydrodynamic torque converter with a uni-shaft turbine it will be found, however, that the torque curves for the delivered torque of the gas turbine (at a constant turbine temperature) and for the absorbed torque of the hydrodynamic torque converter have approximately the same angle of inclination, which makes that the curves intersect one another at a very small angle, resulting in a more or less reliable state of balance. Below a certain value of the turbine speed, corresponding to the lower point of intersection between the two torque curves, an unstable operating condition is obtained.

By forming the hydrodynamic torque converter with adjustable guide blades a good balance may be obtained, however, with completely stable operating conditions, if said blade adjustment is made variable in such relation to the fuel control of the turbine that the torque characteristics of the turbine and the hydrodynamic torque converter intersect each other in such manner that the torque curve of the turbine has a slope which is smaller than that of the torque curve for the input torque of the hydrodynamic torque converter.

By varying the method of control for the blade angle or blade angles of the hydrodynamic torque converter in relation to the fuel control position, a combination may be obtained, wherein alternatively the speed of the gas turbine is kept constant or is made increasing or falling with increasing output shaft speeds, while a good balance and stability is obtained all the time between the gas turbine and the hydrodynamic torque converter.

Said arrangement results in a very condensed and light engine unit, which at the same time yields a high efficiency and a low fuel consumption in consequence thereto.

Furthermore, as the combined useful and compressor turbine, in combination with the hydrodynamic torque converter, may be made cheaper and simpler than a separate useful turbine combined with an automatic gearing (corresponding approximately to the same traction power performance), the advantages of the system described are readily understood in this respect.

The hydrodynamic torque converter may be dimensioned for a particularly high speed with a considerable reduction of the linear dimensions, inasmuch as the transmitted power is proportional to the number of revolutions raised to the third power. Furthermore, the hydrodynamic torque converter operates with oil, compared with gas in a gas turbine of the free turbine type, for which reason the very great difference in specific weight of the working medium results in very small dimensions for the reaction member as well as for the turbine and pump members of the hydrodynamic torque converter. Furthermore, the hydrodynamic turbine operates at a temperature which is only a fraction of those occurring in the turbine member of the gas turbine, which results in that an inexpensive and easily workable turbine material may be used, while problems of creeping strength and cooling are obviated practically entirely. Also a higher efficiency is obtained in a hydrodynamic turbine by reason of the fact that a closed turbine wheel may be used, whereby end losses and leakage over the blade crests can be eliminated entirely. Furthermore, it is possible with a simple hydrodynamic torque converter, containing only three elements (pump, turbine and reaction member) to attain a much flatter efficiency curve and a starting gear ratio more than three times greater than the gear ratio possible to attain in previous known gas turbines containing a separate driving turbine. It might be mentioned, furthermore, that the utilization factor (defined as the ratio between the higher and the lower speeds at which the efficiency curve amounts to 70% at full gas) in a combination according to the present invention amounts to about 3.5, whereas the same ratio amounts to about 2.5 in gas turbines containing a free turbine.

The invention will be further explained in the following with reference to forms of embodiment with appertaining diagrams shown in the accompanying drawings. FIG. 1 represents a section through the turbine member and the pump member of a hydrodynamic torque converter with adjustable pump blades, and FIG. 2 shows a similar section through the reaction member of a torque converter with adjustable reaction blades. FIG. 3 is a diagram referring to the torque converter according to FIGS. 1 and 2. FIG. 4 is a diagram referring to a uni-shaft gas turbine with fixed and pivoted guide blades, respectively. FIG. 5 is a diagram of the efficiency and the gear ratio of a hydrodynamic torque converter according to the present invention. FIG. 6 is a diagrammatic representation of a substantially complete gas turbine power plant according to the invention, and FIGS. 7 to 9 show various embodiments of a torque converter pertaining to the plant. FIGS. 10 and 11 show a pair of embodiments of the gas turbine member in a plant according to the invention.

FIG. 1 shows the pump and turbine members of a hydrodynamic device combined with a gas turbine, wherein the pump member is provided with adjustable blades.

FIG. 2 shows the reaction member of the hydrodynamic torque converter considering the case of the same being provided with adjustable blades.

Figure 6:
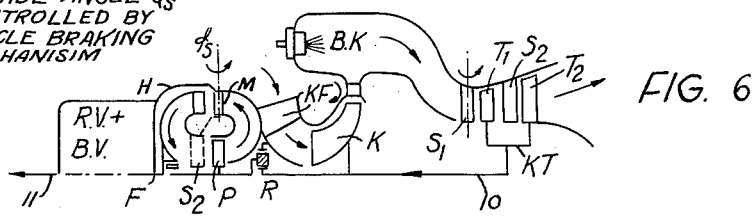

FIG. 3 shows how the torque ($M_P^*$) absorbed by the pump of the hydrodynamic torque converter varies as a function of the speed ratio between the turbine and the pump thereof ($n_T/n_p$) and as a function of the angle of adjustment for the pump and guide blades ($\varphi_P$ and $\varphi_S$), respectively. The torque absorbed by the pump increases with an increasing outlet angle for the pump and the guide blade, respectively, in accordance with the showing of FIG. 3.

By making the adjustment of the blades automatic and continuously variable as a function of the throttle valve position, i.e. of the injected fuel quantity, different progresses of said pump torque ($M_P^*$) may be obtained. The groups of curves $a$, $b$ and $c$ and $a_1$, $b_1$ and $c_1$, respectively, as shown in FIG. 3 represent said torque absorbed by the pump for different throttle valve adjustments and as a function of the speed ratio ($n_T/n_p$), the curves $a$, $b$ and $c$ representing one construction and the curves $a_1$, $b_1$ and $c_1$ another construction, which is dependent on the leverage selected for the movement of the throttle valve control and the control for the angle of adjustment of the blades.

FIG. 4 shows the output torque for a uni-shaft gas turbine. The curves $T_1^*$, $T_2^*$ and $T_3^*$ indicate a varying turbine temperature ($T^*$) and fixed guide blades. A corresponding progress of the torque with pivoted guide blades is indicated by $T_1^*(VR)$, $T_2^*(VR)$ and $T_3^*(VR)$. With a constant fuel quantity the progress of the torque varies according to the corresponding curves $B_1^*$, $B_2^*$ and $B_3^*$ and $B_1^*(VR)$, $B_2^*(VR)$ and $B_3^*(VR)$, respectively. FIG. 4 also contains the groups of curves $a$, $b$ and $c$ and $a_1$, $b_1$ and $c_1$, respectively, for the absorbed pump torque ($M_P^*$), which correspond to the throttle valve positions for a constant turbine temperature $T_1^*$, $T_2^*$ and $T_3^*$ or a constant fuel quantity $B_1^*$, $B_2^*$ and $B_3^*$. The points of intersection between the curves $a$ and $T_1^*$, $b$ and $T_2^*$ and $c$ and $T_3^*$ are located on a curve which in FIG. 4 is parallel to the ordinate axis, that is to say, the fuel control and the blade control of the hydrodynamic torque converter and/or the compressor turbine are so adapted relatively to each other that the speed of the compressor and thus of the compressor turbine and of the pump of the hydrodynamic torque converter becomes constant or nearly so, independently of the load, corresponding to the curve I in FIG. 4.

By altering the leverage between the throttle valve control and the blade control another operating line, corresponding to a compressor speed increasing with an increasing load, or vice versa, may be obtained. This is illustrated by the curve II in FIG. 4.

FIG. 5 illustrates the efficiency and the gear ratio for the hydrodynamic torque converter with adjustable pump and/or guide blades as used in the plant according to the invention (and is related to the progress of the absorbed pump torque shown in FIG. 3). With respect to the efficiency and the torque multiplication it holds true within certain limits that the maximum efficiency is displaced toward lower turbine speeds corresponding to a lower speed ratio ($n_T/n_p$) at decreasing angles of adjustment for pump and guide blades, respectively, with a simultaneous increase of the torque multiplication at start, and vice versa.

A few embodiments of the gas turbine power plant and elements associated therewith will be described in the following.

FIG. 6 shows an arrangement with a compressor K and a compressor turbine KT on one and the same power output shaft 10, which also drives the pump (P) of a hydrodynamic torque converter over a planet gear R. The torque converter consists of a stationary housing H and the pump P, a reaction member M and a turbine member $S_2$ connected to the output shaft 11 which includes a reverse gear BV and reduction gear RV. The reaction member is provided with pivoted blades in at least one of the rims. The guide blade rims of the compressor and the gas turbine may be made either with fixed or with pivoted blade elements.

The reverse gear BV is arranged behind the hydrodynamic torque converter, possibly in combination with the reduction gear RV.

Furthermore, a free wheel F is incorporated between the pump and the turbine to provide an engine brake, said free wheel being so arranged that the pump may rotate faster than the turbine, but not vice versa. With a driving turbine, the free wheel locks the turbine to the pump, so that both of said elements rotate with the same speed, a very valuable additional brake (hydrodynamic brake) being thus obtained.

By turning the reaction blades so as to reverse the torque acting on the turbine member said brake effect may be controlled continuously as desired. The arrangement for turning the blades may possibly be connected to the braking mechanism of the vehicle as denoted by the legend on FIG. 6, the braking effect then permitting of taking place in a stepwise or continuously varying fashion.

KF denotes cooling flanges, which in the illustrated case have been cast integrally with the stationary converter housing, which is preferably made from light metal (electron). Through the arrangement shown, cooling of the flowing medium in the hydrodynamic converter, valuable particularly in braking, will be obtained. If desired, said cooling flanges may be made hollow to be traversed by the flowing medium of the hydrodynamic torque converter, the natural difference in pressure in the torque converter then permitting of being utilized to bring about said circulation through the cooling flanges.

In connection with FIG. 6 it should be noted, furthermore, that the hydrodynamic torque converter is made of a torus-shape of the lying type, the pump blades being arranged on a small hub at the inner portion, whereas the turbine blades are disposed at the outer portion. Hereby a particularly high gear is obtained over the hydrodynamic torque converter, and consequently, with the arrangement shown, the reduction gear R may be made with a comparatively small ratio of gear or may even be omitted in certain cases, in connection with gas turbines with a moderate rotational speed.

Figure 7:
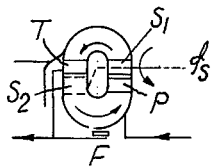

FIG. 7 shows a variant of FIG. 6 with respect to the torus-shape of the hydrodynamic torque converter. Here, the torque converter is also provided with a reaction member $S_1$ with adjustable blades, and possibly with a further reaction member $S_2$. Furthermore, a so-called brake free wheel F is provided.

By the adjustable reaction member $S_1$ being located between the pump P and the turbine T, an effective engine brake may be obtained here by reversing the direction of rotation of the flowing medium in front of the turbine, the free wheel then possibly permitting of being omitted. Furthermore, there is a possibility by the embodiment shown to provide a reverse gear in the actual hydrodynamic torque converter, and consequently the mechanical reverse gear may possibly be omitted in certain cases.

Figure 8:
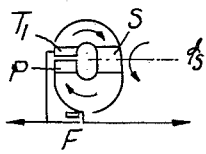

FIG. 8 shows a further variant with respect to the hydrodynamic torque converter, the reaction member S having been located between the turbine $T_1$ and the pump P (counted in the direction of flow). In this embodiment, a special reverse gear is required.

Figure 9:
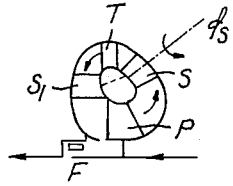

FIG. 9 shows a further embodiment, wherein the reaction member S is placed between spherical and concentrical surfaces, the centre line of the pins of the pivoted blades then coinciding with the radius of said concentric spheres. Said arrangement makes it possible to place the turbine at the greatest possible radius with the pump located at the smallest possible radius, while an otherwise suitable arrangement of the circuitous path of the hydrodynamic torque converter is obtained.

Figure 10:
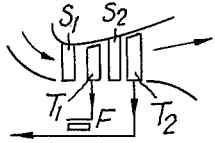
Figure 11:
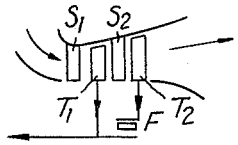

FIGS. 10 and 11 show alternative embodiments as far as the compressor turbine is concerned, the first or the second turbine step being provided with a free wheel F, possibly in combination with a reduction gear between the same and the turbine shaft. Hereby, a flatter efficiency curve for said turbine is made possible.

Obviously, the invention is not limited to the embodiments shown but may be varied within the scope of the illustrated principles and the annexed claim.

What I claim is:

A gas turbine power plant having an output shaft and comprising a single gas turbine member having a power output shaft, a combustion chamber member adapted to produce motive fluid for driving said turbine member, a compressor member driven by said power output shaft of said turbine member and delivering combustion air to said combustion chamber member, and a hydrodynamic torque converter having a pump member, a turbine member and a reaction member arranged in a closed liquid flow circuit, said converter pump member being connected to said gas turbine power output shaft and said converter turbine member being connected to said output shaft of the plant, said reaction member including blading which is adjustable into a position to reverse the torque acting on said converter turbine member.

References Cited in the file of this patent

UNITED STATES PATENTS

| | | |
|---|---|---|
| 1,199,361 | Fottinger | Sept. 26, 1916 |
| 2,314,370 | Ball | Mar. 23, 1943 |
| 2,327,647 | Jandasek | Aug. 24, 1943 |
| 2,336,052 | Anderson et al. | Dec. 7, 1943 |
| 2,631,427 | Rainbow | Mar. 17, 1953 |
| 2,651,492 | Feilden | Sept. 8, 1953 |
| 2,667,744 | Butler | Feb. 2, 1954 |
| 2,932,940 | Edsall et al. | Apr. 19, 1960 |

FOREIGN PATENTS

| | | |
|---|---|---|
| 495,469 | Great Britain | Feb. 8, 1937 |